United States Patent

Suzuki et al.

[11] 4,135,904
[45] Jan. 23, 1979

[54] PREMELTING METHOD FOR RAW MATERIALS FOR GLASS AND APPARATUS RELEVANT THERETO

[75] Inventors: Takeshi Suzuki; Mikio Murao; Susumu Utiyama, all of Kobe; Kyohei Hatanaka; Hajime Inoue, both of Matsusaka, all of Japan

[73] Assignees: Kawasaki Jukogyo Kabushiki Kaisha, Kobe; Central Glass Co., Ltd., Ube, both of Japan

[21] Appl. No.: 850,692

[22] Filed: Nov. 11, 1977

[30] Foreign Application Priority Data

Nov. 15, 1976 [JP] Japan ............................. 51-137532
Nov. 15, 1976 [JP] Japan ............................. 51-137533
Nov. 15, 1976 [JP] Japan ............................. 51-137534
Nov. 15, 1976 [JP] Japan ............................. 51-137535

[51] Int. Cl.$^2$ .......................................... C03B 3/00
[52] U.S. Cl. .................................. 65/27; 65/134; 65/335
[58] Field of Search ............... 65/27, 134, 135, 136, 65/335

[56] References Cited

U.S. PATENT DOCUMENTS

3,443,921  5/1969  Boivent .................................. 65/134
3,607,190  9/1971  Penberthy ............................. 65/134

*Primary Examiner*—Arthur D. Kellogg
*Attorney, Agent, or Firm*—Blanchard, Flynn, Thiel, Boutell & Tanis

[57] ABSTRACT

A method of premelting the raw materials for glass, which comprises burning a fuel by atomizing it within a combustion chamber while blowing combustion air into said combustion chamber so as to swirl along the inner wall thereof, feeding the raw materials for glass to said combustion chamber to effect partial premelting thereof, letting the thus premelted raw materials together with the combustion gas flow out from the lower part of the combustion chamber by way of a downwardly inclined duct, separating the premelted raw materials from the combustion gas, leading the premelted raw materials thus separated into a melting furnace, and utilizing the exhaust gas generated in the combustion chamber and/or the melting furnace effectively.

23 Claims, 12 Drawing Figures

PREMELTING METHOD FOR RAW MATERIALS FOR GLASS AND APPARATUS RELEVANT THERETO

BACKGROUND OF THE INVENTION

1. Field of the Invention

The present invention relates to a premelting method for the raw materials for glass as well as an apparatus relevant thereto. To be more precise, it is intended to provide a method of premelting the raw materials for glass which is high in heat efficiency and demonstrates a superior controllability, together with a compact premelting apparatus, which is low in the cost of equipment, for use in practicing said method.

2. Description of the Prior Art

At the time of industrial manufacturing of flat glass, glass fiber, etc., a large-sized furnace, or a glass tank furnace, is usually employed, and all of such processes as the heating of raw materials for glass, melting and refining have hitherto been performed by means of a single glass tank furnace.

Illustrated in FIG. 1 is a longitudinal sectional view taken along the length of a conventional glass tank furnace 40. In this apparatus, the temperature within the furnace is so controlled as to attain the maximum at about the center of the glass tank furnace to cause an upwardly flowing stream to exist at region 41. The stream of glass circulates in the direction of the solid line arrows. The zone in front of the region 41, to wit, the left part in FIG. 1, constitutes the premelting zone 42 to perform the heating and melting of the raw materials for glass fed therein. The zone inbetween the region 41 and the throat 43 is the melting zone 44 for the purpose of further advancing the premelting of raw materials for glass so as to effect homogenization as well as defoaming. The part to the rear of the throat 43, to wit, the right part in FIG. 1, constitutes the refining zone 45 for the purpose of accelerating the refining.

In said premelting zone 42, replenishing raw materials for glass are supplied in proportion to the amount of glass drawn out of the furnace and are piled up on the premelted materials of glass, and the heating and premelting are performed by flames contacting with the surface layer portion of raw materials for glass together with heat conduction to the bottom portion thereof. As for the inner layer of said raw materials for glass, however, premelting is retarded as the heat conduction is impeded by the vitrified surface layer of materials for glass, and what is more, because of the high viscosity of the vitrified materials, the velocity of convection thereof in relation to the preceding premelted glass is very low. For such reasons, the thermal efficiency is very inferior, and a tremendous amount of fuel is required. Inasmuch as all the foregoing processes are to be performed by a glass tank furnace of poor heat transmission efficiency, there would arise a vicious circle that the furnace is required to be of a large size, and enlargement of the furnace leads to increase in radiation heat loss. Besides, when the furnace is of a large size, it would be attended with such demerits that it must employ high-grade refractory materials in abundance and it is apt to be damaged frequently, so that it is costly.

SUMMARY OF THE INVENTION

The present invention relates to a method of premelting the raw materials for glass, which method comprises burning a fuel by atomizing it within a combustion chamber so as to swirl along the inner wall thereof, premelting by heating the raw materials for glass fed to said combustion chamber, letting the thus premelted raw materials together with the combustion gas flow out from the lower part of the combustion chamber by way of a downwardly inclined duct, and separating said premelted raw materials from the combustion gas.

DESCRIPTION OF THE PREFERRED EMBODIMENTS

Figure 1:
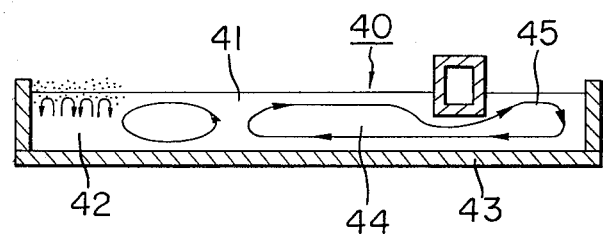
FIG. 1 is a schematic longitudinal sectional view of a prior art glass tank furnace.
Figure 2:
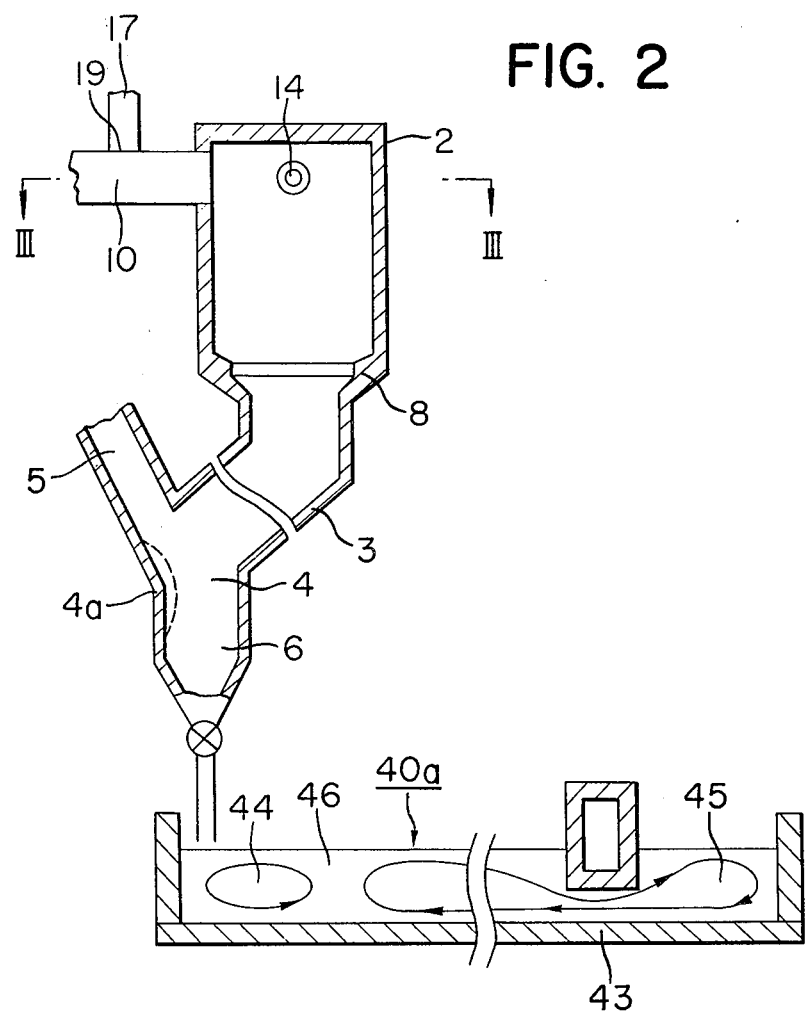
FIG. 2 is a schematic longitudinal sectional view of an apparatus according to the invention, taken along line II—II of FIG. 3.
Figure 3:
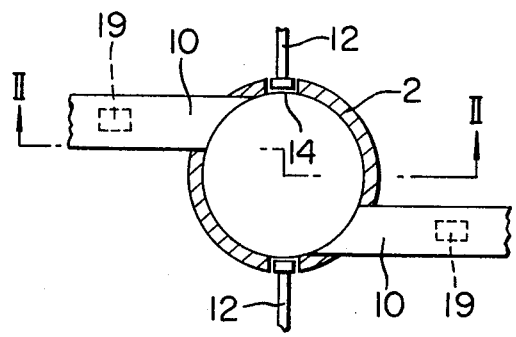
FIG. 3 is a sectional view taken along line III—III of FIG. 2.

Particulars of an example embodying the present invention will be hereunder explained with reference to the appended drawings. In the drawings, FIG. 2 is a longitudinal section of said embodiment, and FIG. 3 is a sectional view taken along the line III—III in FIG. 2. FIG. 2 illustrates a sectional view taken along the cutting line II—II in FIG. 3. To the lower end of a right cylindrical combustion chamber 2 having a circular horizontal section is connected a downwardly inclined duct 3 for the purpose of taking out the premelted raw materials for glass. Said downwardly inclined duct 3 has a circular section, and its lower end is connected to a duct 6 through which the premelted raw materials for glass are to descend. Onto the boundary portion between these two ducts 3 and 6 is connected an upwardly inclined duct 5 for combustion exhaust gas. The outlet of the combustion chamber 2 is connected to the downwardly inclined duct 3 through a conically throttled portion 8. An air inlet duct 10 opens into the upper part of the combustion chamber 2 so as to blow air therein in a tangential direction, and the air thus blown into the combustion chamber 2 swirls within the combustion chamber 2. In the combustion chamber 2, the fuel is atomized and blown in by a fuel jetting nozzle 14 which interconnects with fuel feed pipes 12 disposed face to face at places close to the tangential direction of the air flow from air inlet duct 10 so as to commingle with the foregoing swirling air current, and to perform high load combustion. To the air inlet duct 10 is connected a raw material inlet port 19. Because the powdery raw materials for glass are put into the combustion chamber 2 from a chute 17 by way of the air inlet duct 10, dispersion thereof within the combustion chamber 2 can be performed sufficiently.

Inasmuch as the heat transmission between the raw materials supplied in a suspended state and the combustion gas is performed satisfactorily in the combustion chamber 2, the heating and premelting of the raw materials for glass are accomplished effectively. These premelted raw materials for glass stream down along the downwardly inclined duct 3 connected to the lower part of the combustion chamber 2, while the combustion exhaust gas is drawn into the downwardly inclined duct 3 by means of a blower (not shown) disposed on the side of the exhaust duct 5. Both the premelted raw materials for glass and the combustion exhaust gas flow toward a separation point 4. The premelted raw materials for glass stream down along the duct wall and pass through the duct 6 and descend therein, while the combustion exhaust gas is drawn into the upward exhaust duct 5. A part of the raw materials for glass which is not premelted within the combustion chamber 2 is mostly premelted in the course of flowing downwardly within the downwardly inclined duct 3 together with the combustion exhaust gas and it also streams down along the inner wall of the downwardly inclined duct 3. The downwardly inclined duct 3 is provided with a length sufficient for effecting such premelting. Any powdery raw materials for glass not premelted even during this process arrive at the separation point 4 together with the combustion exhaust gas, whereat said combustion exhaust gas takes a sudden turn to enter the exhaust duct 5 and separates from said raw materials, while said powdery raw materials for glass collide with the vicinity of the portion 4a of wall surface due to inertia. The powdery raw materials for glass thus colliding with the wall surface portion 4a adhere to the premelted raw materials for glass on said portion and undergo premelting. Inasmuch as the raw materials for glass are never drawn into the combustion exhaust gas flowing in the exhaust duct 5 as described above, there occurs no change in the chemical composition of the raw materials. The premelted raw materials for glass stream down along the duct 6 and flow into the following glass tank furnace 40a to undergo further melting and refining therein. This glass tank furnace 40a does not require the provision of any premelting zone 42 such as is employed in the conventional glass tank furnace, and it can be called a simple melting furnace. As regards the furnace temperature, burners and the like are so arranged that the highest-temperature section should be located in between the melting zone 44 and the throat 43, and in this section should be formed the region 46 at which an upwardly rising stream exists. By virtue of disposing the region 46 in such a position, the convection route as well as the period of convection of the melted glass is lengthened and, as a result, the functions of homogenizing and defoaming the glass can be efficiently fulfilled.

Figure 4:
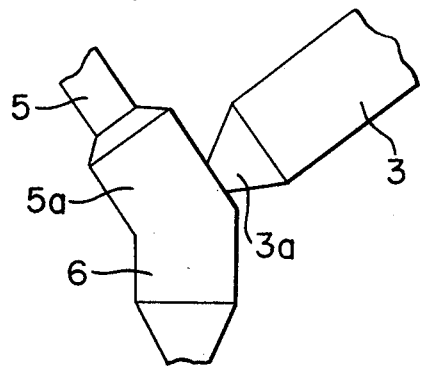
FIG. 4 is a front view of a modification of a portion of FIG. 2.

In order to separate the premelted glass from the combustion exhaust gas more efficiently, it is advisable to enlarge particularly the sectional area of the lower end portion 5a of the exhaust duct 5 as illustrated in FIG. 4 thereby lowering the velocity of the combustion exhaust gas in this part, or to contract the lower end portion 3a of the inclined duct 3 thereby increasing the velocity of the same in this part. Also, it will do to erect said exhaust duct 5 for combustion exhaust gas upright. The configuration of the combustion chamber 2 is not limited to the above described one; it may of conical shape or the like.

As elucidated in the foregoing, in the present invention, inasmuch as the gas and the powdery raw materials for glass are effectively mixed with each other in the combustion chamber thereby to effect heat transmission, and this heat transmission is further effected in the course of their streaming out of the combustion chamber, the thermal efficiency improves remarkably and the fuel consumption is reduced drastically. And, at the same time, by virtue of the combination of a compact combustion chamber and a downwardly inclined duct, the premelting of raw materials for glass can be performed almost completely. Besides, since the glass tank furnace for the succeeding process suffices to function only for completing the melting and performing the refining, it can be of a very small size and, consequently, not only the cost of equipment is moderate but also there can be expected enhancement of the thermal efficiency due to a decrease in radiation loss, coupled with a drastic decrease in the consumption of high-grade refractory materials for the glass tank furnace. Moreover, according to the present glass furnace, because the conventional premelting process which is in a very unstable condition wherein the powdery raw materials for glass are apt to commingle with the premelted glass is excluded, and a melting and refining process under stable conditions is adopted, the operation of the furnace is simplified and the controllability thereof improves. As described above, the present invention brings on a variety of excellent effects.

Figure 5:
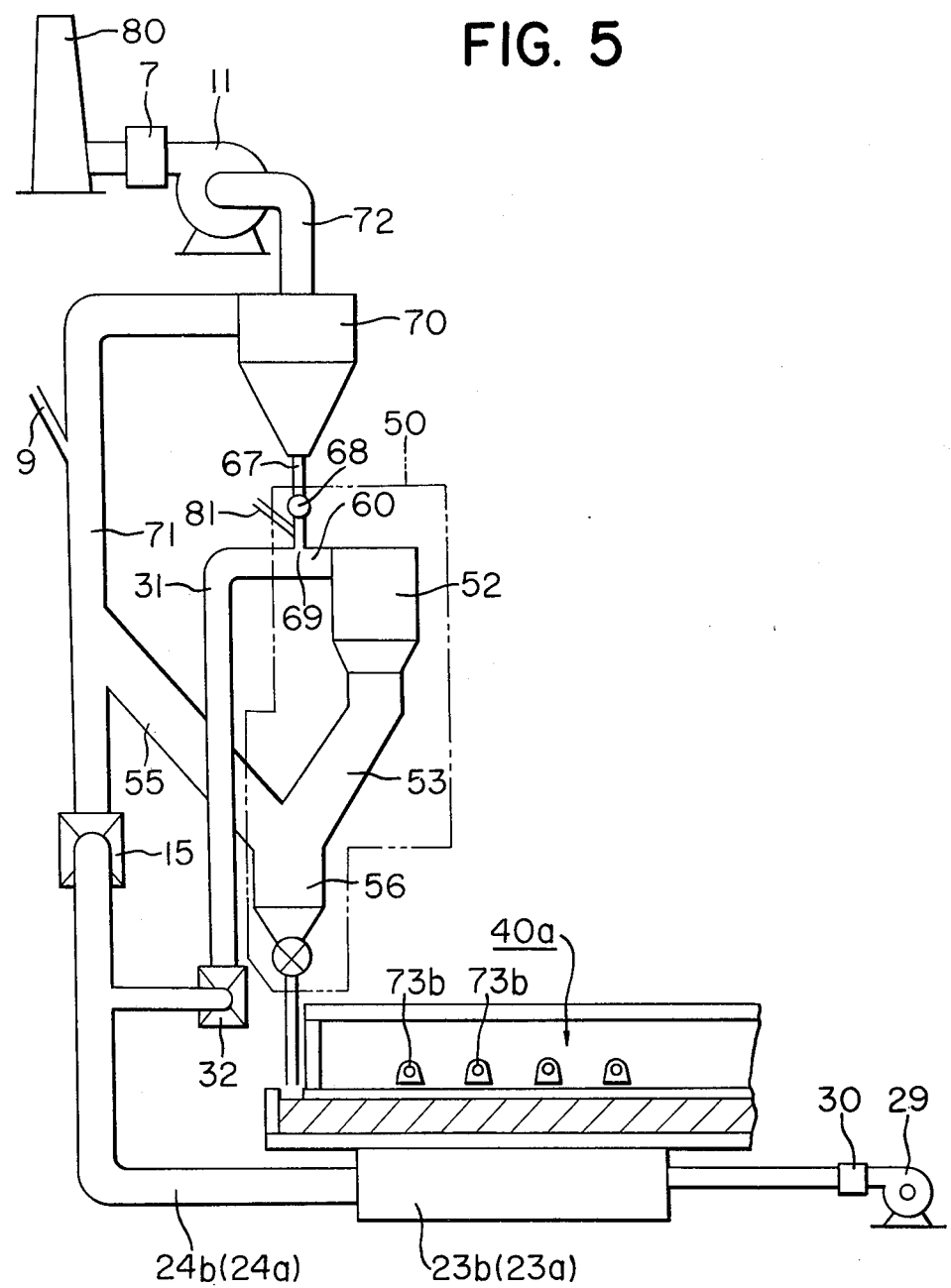
FIG. 5 is a front view of a modified apparatus including means for preheating the raw materials for glass.
Figure 6:
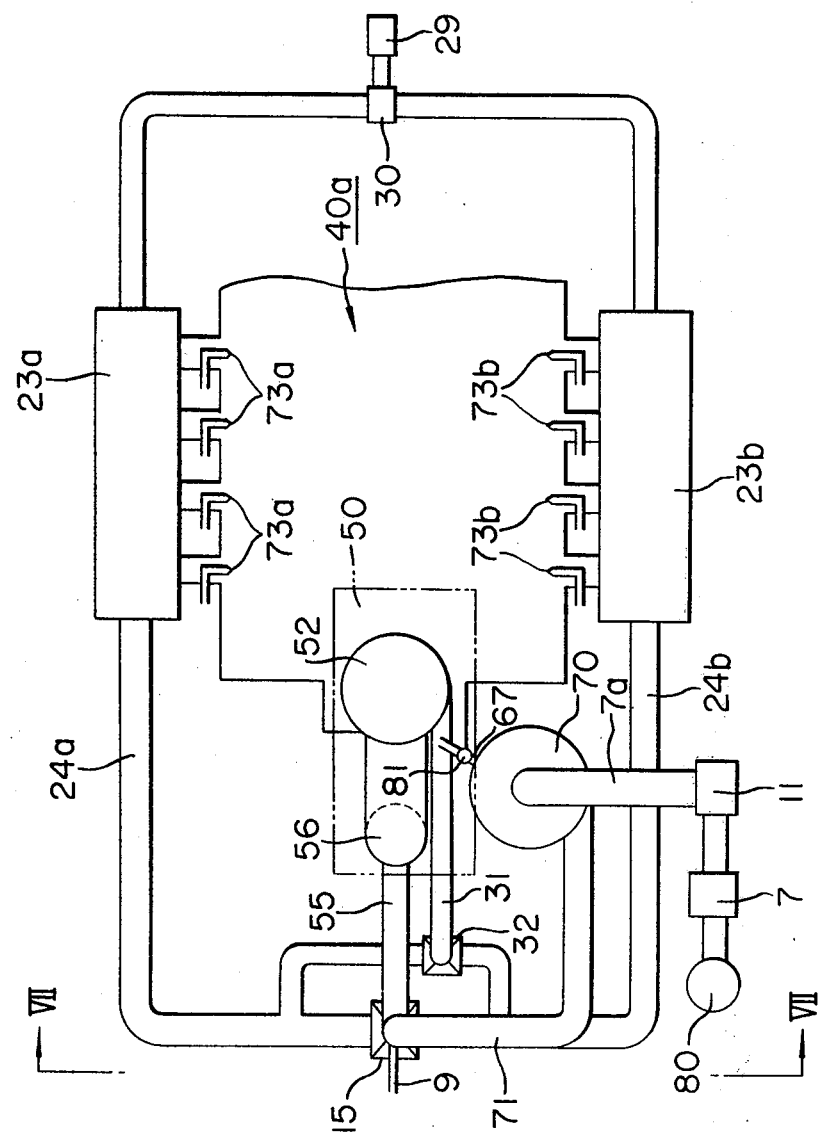
FIG. 6 is a top view of the apparatus of FIG. 5.
Figure 7:
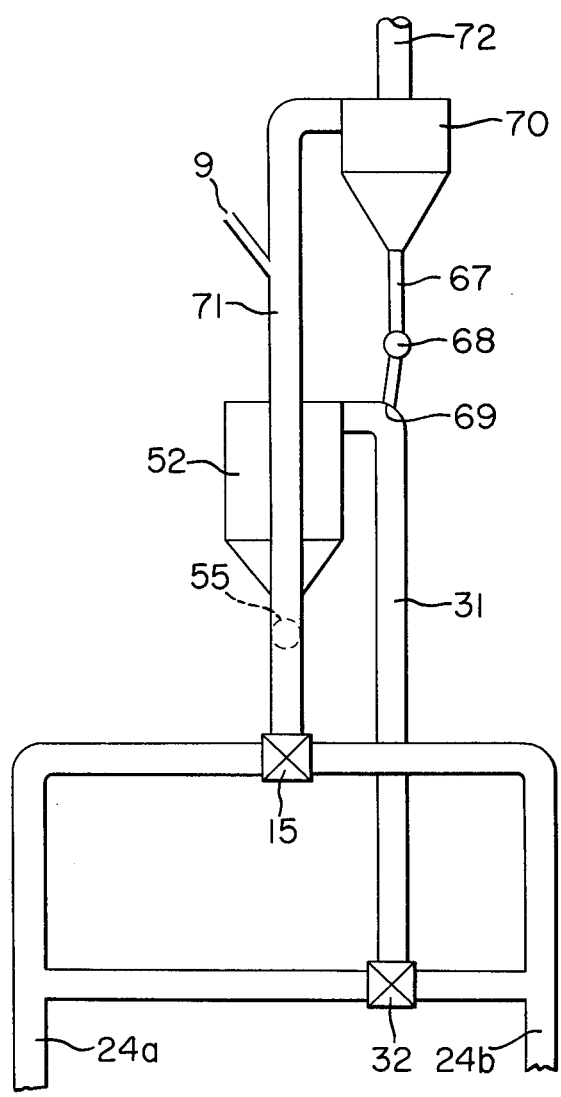
FIG. 7 is a view taken along line VII—VII in FIG. 6.

Further, in the present invention, it is possible to feed the raw materials for glass to the combustion chamber after preheating said materials in a suspended state by means of the exhaust gas generated in the premelting furnace and/or the melting furnace. FIG. 5 is a front view which illustrates a mode of apparatus for practicing this method, FIG. 6 is a plan view of the same apparatus, and FIG. 7 illustrates the parts in the vicinity of an exchanging damper 15 as viewed along the line VII—VII in FIG. 6.

In this apparatus, into the cyclone 70 for the purpose of preheating the raw materials for glass is introduced a high-temperature exhaust gas discharged from the premelting furnace 50 and the melting furnace 40a by way of the inlet duct 71. On the side of the inlet port of said inlet duct 71 for the cyclone 70 is provided a feed pipe 9 for the powdery raw materials for glass which have been weighed, proportioned and mixed. To this feed pipe 9 is conveyed raw materials for glass other than carbon and cullet by the conventional transport equipment.

Said high-temperature exhaust gas containing the powdery raw materials for glass is separated from said raw materials for glass in the cyclone 70 and is released to the atmosphere through the channel of exhaust duct 72, induction fan 11, desulfurization/denitration equipment 7 and stack 80 in that order. The raw materials for glass fed through the feed pipe 9 are heated while in contact with the high-temperature exhaust gas in a suspended state, collected by the cyclone 70, and sent to the premelting furnace 50 with the aid of the feeder 68 from chute 67.

The raw materials for glass premelted by means of the premelting furnace 50 are led to the melting furnace 40a. In the melting furnace 40a, two groups of burners 73a and 73b are alternately employed at intervals of fixed period. To the group of burners 73a (or 73b) in use is supplied the combustion air heated by the regenerator 23a (Or 23b). From the side of the group of burners 73b (or 73a) not in use is discharged a high-temperature combustion exhaust gas, and this exhaust gas heats the checker bricks of the regenerator 23b (or 23a) and then is sent to the exhaust duct 24b (or 24a). The exhaust gas sent to the exhaust duct 24b (or 24a) is led to the inlet duct 71 with the aid of the exchanging damper 15, and is used for preheating the raw materials for glass. The exchanging damper 15 is appropriately switched over depending on which of the two groups of burners 73a and 73b is to be used. The exhaust gas coming out of the premelting furnace 50 is led to the inlet duct 71 through the exhaust duct 55.

Combustion air for use in the premelting furnace 50 and the melting furnace 40a is taken in through the blower 29, and is sent to the regenerator 23a or 23b of the group of burners 73a or 73b in use by way of the damper 30. This combustion air is heated up to a high temperature while passing through the regenerator 23a or 23b. A part of the thus heated combustion air is sent to the premelting furnace 50 through the channel of exhaust duct 24a or 24b, damper 32 and inlet duct 31, in that order. The damper 32 functions to connect the inlet duct 31 to the exhaust duct 24a or 24b whereto the heated combustion air is being sent.

Carbon, which is one constituent of the raw materials for glass and is supposed to be applied in a small amount, is apt to scatter so that there is a fear of its being discharged from the cyclone 70 along with the exhaust gas in the case where it is fed through the feed piper 9. Therefore, this carbon is fed through the feed pipe 81 disposed in between the feeder 68 and the air inlet duct 60.

Cullet for facilitating the premelting of the raw materials for glass is normally in the form of coarse particles, and therefore, in the case where it is fed through the feed pipe 9, there is a fear that it will damage the lining of the cyclone 70. Therefore, this cullet is fed through the feed piper 81 together with the foregoing carbon. Further, it also will do to feed it from time to time together with fellow raw materials for glass through the feed pipe 9 so as to remove the coating which is apt to deposit on the inner wall of cyclone 70, by taking advantage of the fact that cullet is in the form of coarse particles. Before feeding through the feed pipe 9, the cullet may be preheated by using a part of the exhaust gas.

As elucidated above, according to the present invention, the high-temperature exhaust gas which has hitherto been used merely for heating the checker bricks is utilized for preheating the raw materials for glass, and therefore premelting of the raw materials for glass can be performed at much higher thermal efficiency compared with the conventional glass tank furnace, conjointly with the superiority of thermal efficiency of the premelting furnace.

Figure 10:
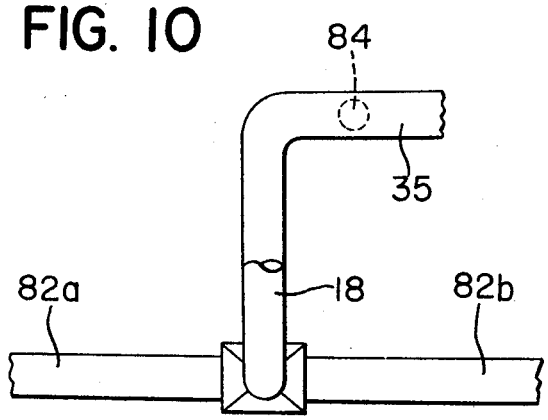
FIG. 10 is a view taken along line X—X of FIG. 9.
Figure 8:
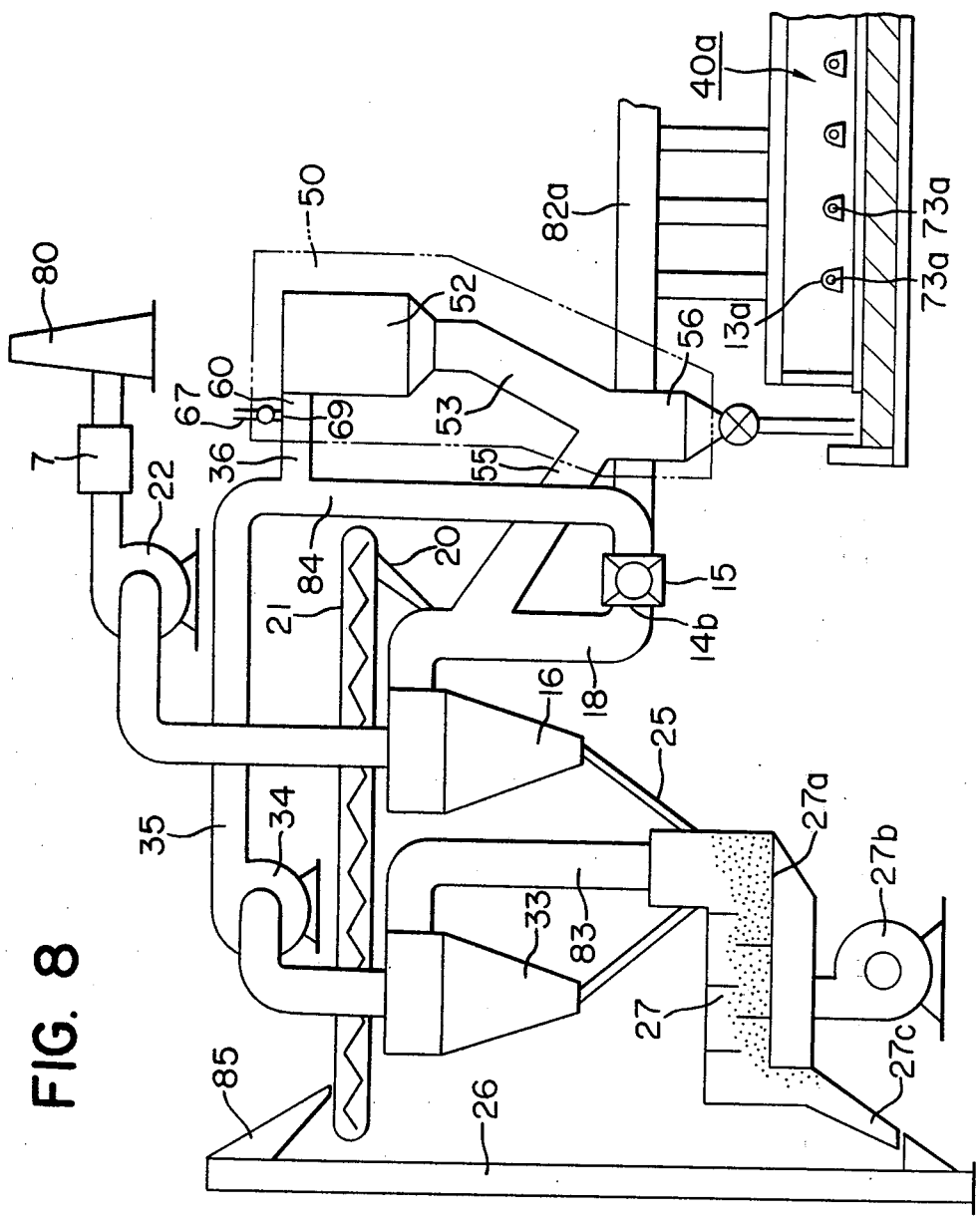
FIG. 8 is a front view of a modified apparatus.
Figure 9:
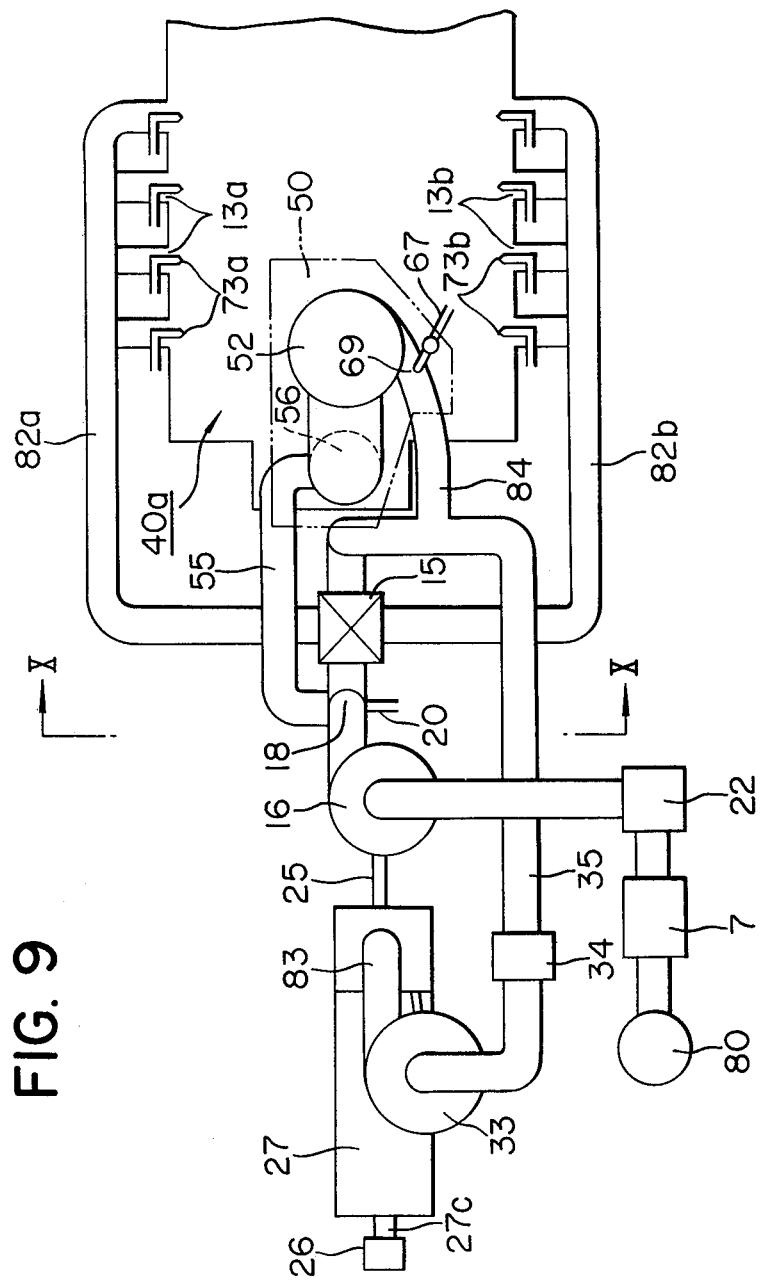
FIG. 9 is a top view of the apparatus of FIG. 8.

Further, in the present invention, it is possible to heat the powdery heat exchanging medium in a suspended state by the use of the exhaust gas generated in the premelting furnace and/or the melting furnace and then heat the combustion air for use in the premelting furnace and/or the melting furnace by the use of the thus heated heat exchanging medium. FIG. 8 is a front view which illustrates a mode of apparatus for use in practicing this method, FIG. 9 is a plan view of the same apparatus, and FIG. 10 is a view taken along the line X—X in FIG. 9.

In this apparatus, the portions of the melting furnace 40a whereon the heating burners 73a and 73b are installed are provided with the openings 13a and 13b, respectively, which combine the inlet for combustion air and the outlet for exhaust gas. The heating burners 73a and 73b are alternately used at intervals of a fixed period of time. Through the openings 13a (or 13b) on the side in which the burners are in use there is supplied air for combustion, while through the openings 13b (or 13a) on the side in which the burners are not in use there is discharged the high-temperature exhaust gas.

The exhaust gas discharged through the openings 13a or 13b is led into the cyclone 16 for use in heating the heat exchanging medium through the conduit 82a or 82b, exchanging damper 15 and exhaust gas inlet duct 18 in that order. The exhaust gas discharged through the exhaust duct 55 of the premelting furnace 50 is fed into the inlet duct 18. To a portion of the inlet duct 18 close to the cyclone 16 for heating the heat exchanging medium is connected the chute 20 for the purpose of feeding the heat exchanging medium to the inlet duct 18. To this chute 20 is continuously supplied the heat exchanging medium by means of a transport equipment 21 such as belt conveyor or screw conveyor. The heat exchanging medium may be at least one member of the raw materials for glass, for instance, quartz sand, or in lieu of quartz sand, some other heat exchanging medium may be applied having a satisfactory heat exchangeability, to wit, a medium which is superior in heat conductivity, has a large heat capacity, is easy to separate from gas, and scarcely wears down the lining of the cyclone or the like. The heat exchanging medium performs heat transmission while suspended in the exhaust gas and then is separated from the exhaust gas by means of the cyclone 16 for use in heating the heat exchanging medium. The exhaust gas after imparting heat to the heat exchanging medium is drawn in by means of the blower 22 from the cyclone 16 and is released to the atmosphere from the stack 80 by way of the desulfurization/-denitration equipment 7.

The heat exchanging medium heated up to a high temperature which has been separated from gas by means of the cyclone 16 is led into the fluidized bed type cooler 27 through the chute 25 and is laid on the distributor 27a. The blower 27b forces air to serve as combustion air into this cooler 27 so as to flow out upward from beneath the distributor 27a in uniformly dispersed fashion. Accordingly, the heat exchanging medium is intensely commingled with air to be brought in a fluidized state and, at the same time, is cooled, and then it is discharged by way of the chute 27c. Also, in this cooler 27, air forced in from the blower 27b is heated by the heat exchanging medium.

A part of the heat exchanging medium fed to the fluidized bed type cooler 27 through the chute 25 is removed after entering the cyclone 33 from the conduit 83 and is reused for heating the combustion air. The combustion air heated by the heat exchanging medium in the fluidized bed type cooler 27 is drawn by the blower 34 and a part thereof is supplied to the premelting furnace 50 from the conduit 84 via the conduit 83, cyclone 33 and conduit 35, while the remainder is sent to the openings 13a or 13b from the conduit 82a or 82b on the side where the heating burners 73a or 73b are in use, via the exchanging damper 15. This combustion air becomes exhaust gas after aiding combustion in the premelting furnace 50 and the melting furnace 40a, and is led to the cyclone 16 for heating the heat exchanging medium through the above described pathway. The exchanging damper 15 is interlocked with the action of heating burners 73a and 73b.

The raw materials for glass are fed from the chute 67 disposed in conduit 36 which is connected to the conduit 84.

The heat exchanging medium discharged from the chute 27c of the fluidized bed type cooler 27 is conveyed upward by means of the bucket elevator 26 and is supplied to the transport equipment 21 from the chute 85. In this way, the heat exchanging medium is used by recycling. As another example embodying the present invention, it also will do to apply a device wherein some raw material for glass, such as quartz sand, is employed as heat exchanging medium and this heat exchanging medium is fed to the premelting furnace 50 from a bucket elevator 26 through the chute 67, without recycling the heat exchanging medium as described above. In this case, since the raw material for glass serving as the heat exchanging medium is previously heated prior to being fed to the chute 67, fuel for use in premelting can be economized. In lieu of the fluidized bed type cooler 27, some other heat exchanger may be employed.

In the case where the conventional regenerator is not used for the melting furnace 40a as illustrated in FIGS. 8, 9 and 10, the problem of variation of temperature of the combustion air attendant upon the heating of combustion air by means of the conventional regenerators is eradicated, and the combustion air can be always maintained at a fixed temperature thereby facilitating the operation, and economical burden is extremely lightened.

Moreover, if desired, a pair of conventional regenerators may be installed in relation to the melting furnace 40a. On this occasion, it also will do to devise such that air is sent with the aid of a blower and an exchanging damper into a regenerator disposed on the side where the heating burners 73a and 73b are in operation thereby effecting the heating, and the exhaust gas generated in said regenerator is led to the conduits 82a and 82b.

The exhaust gas arising from either of the premelting furnace 50 and the melting furnace 40a may be used for heating the heat exchanging medium.

Inasmuch as the present invention is, as described above, devised to heat the combustion air by heating the heat exchanging medium with the exhaust gas arising from the premelting furnace as well as the melting furnace, it can achieve by far higher efficiency compared with the conventional glass tank furnaces, coupled with superior thermal efficiency of the premelting furnace. Besides, inasmuch as the heat exchanging medium employed therein is powdery, the contact area of the high-temperature exhaust gas and combustion air is remarkably enlarged, and accordingly, the present invention brings an excellent effect that not only is it possible to take in the heat energy possessed by the exhaust gas more effectively, but also the combustion air can be heated much more efficiently.

Figure 11:
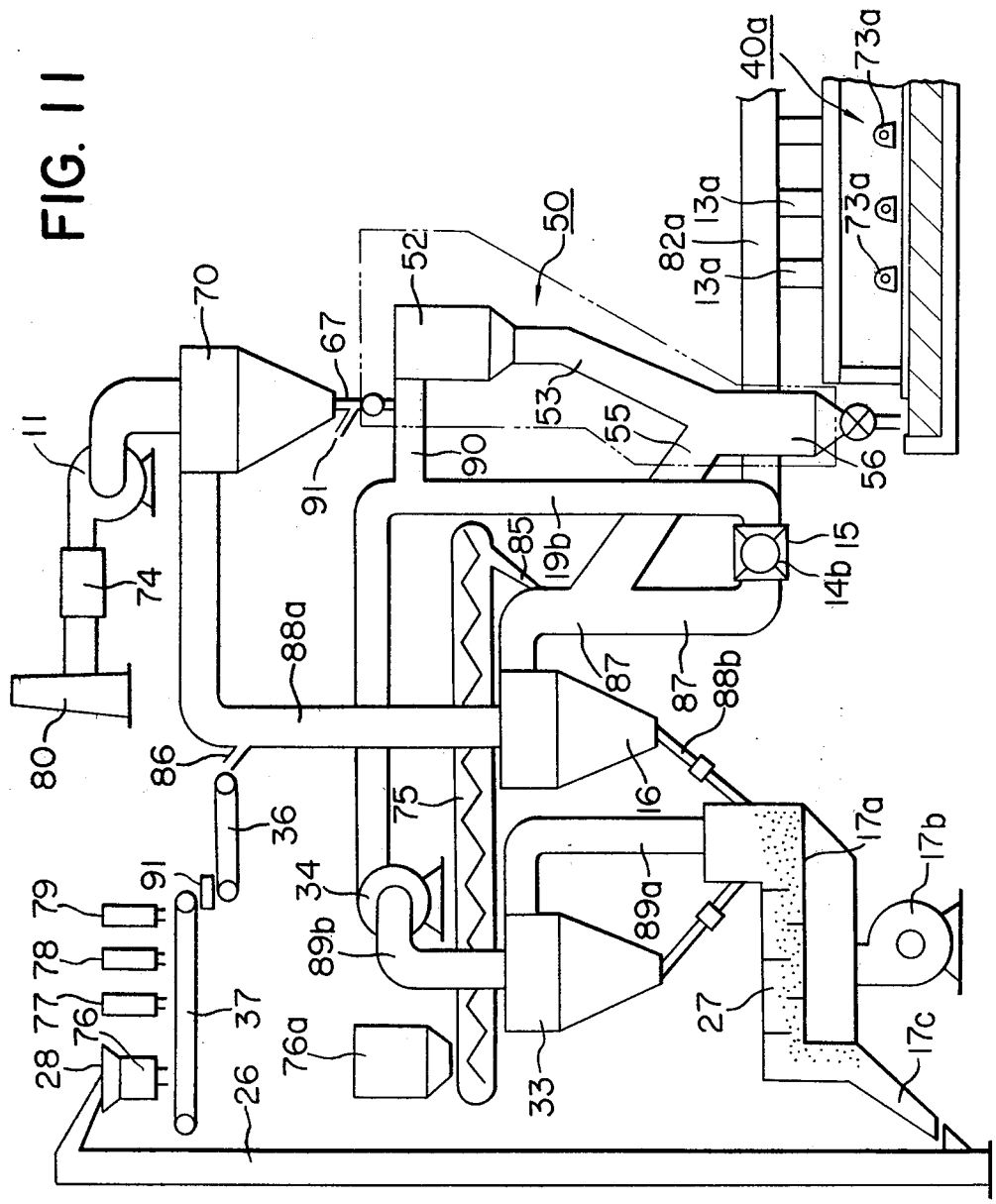
FIG. 11 is a front view of yet another modified apparatus.

Furthermore, in the present invention, the powdery heat exchanging medium can be heated in a suspended state by means of the exhaust gas generated in the premelting furnace and/or the melting furnace, and while heating the combustion air for use in the premelting furnace and/or the melting furnace by means of the thus heated heat exchanging medium, the raw materials for glass can be previously heated in suspended state by means of the exhaust gas used for heating the heat exchanging medium and/ or the exhaust gas not used for heating the heat exchanging medium prior to feeding the raw materials for glass to the premelting furnace. FIG. 11 is a front view which illustrates a mode of apparatus for use in practicing this method, and FIG. 12 is a plan view of the same apparatus.

Figure 12:
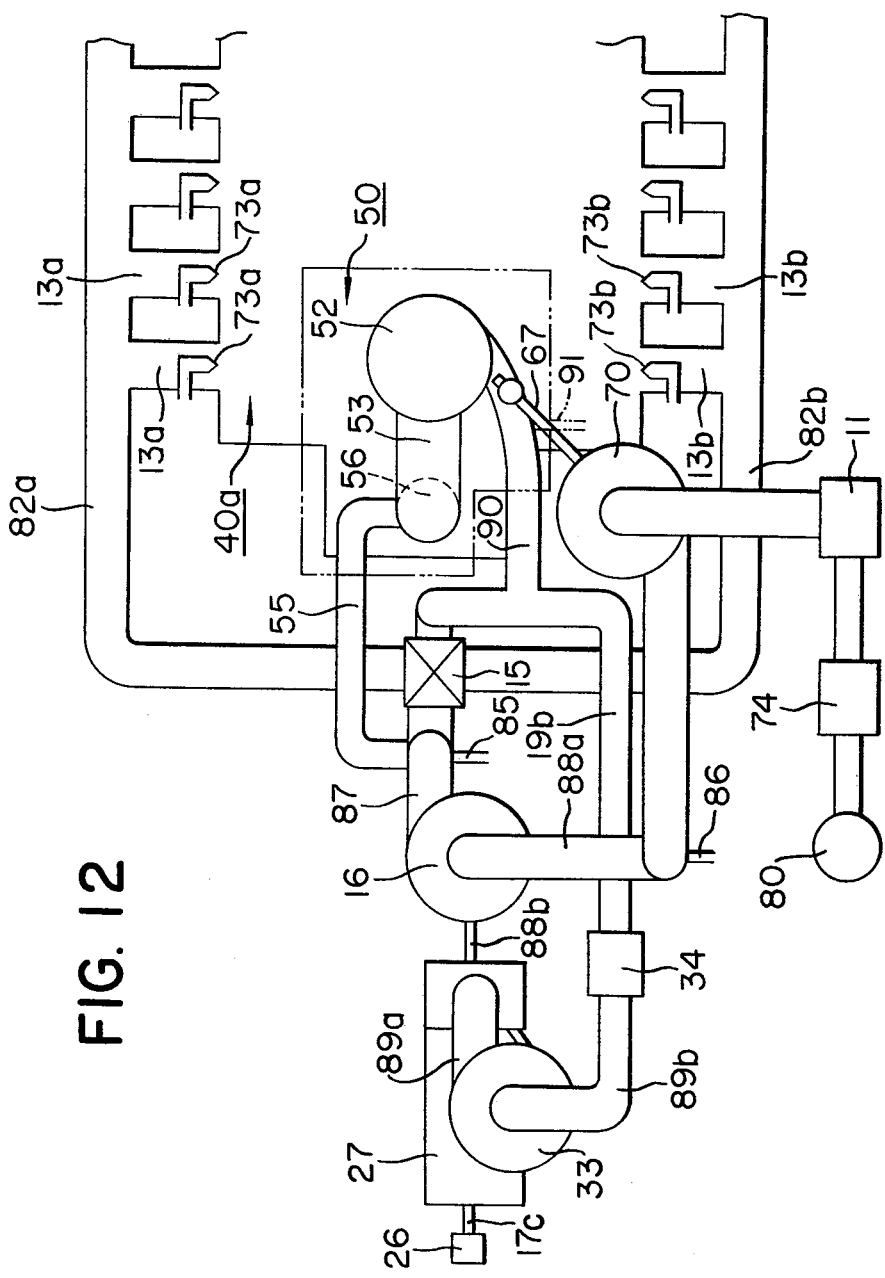
FIG. 12 is a top view of the apparatus of FIG. 11.

To explain the paticulars of this apparatus by reference to FIGS. 11, 12 and 10, in order to minimize the fuel consumption necessary for manufacturing glass by effectively utilizing the latent heat of the exhaust gas arising from the premelting furnace 50 and the melting furnace 40a, (1) after heating the powdery heat exchanging medium fed through the chute 85 by drawing the exhaust gas in the cyclone 16 for the purpose of heating the heat exchanging medium, the exhaust gas is separated, (2) heat exchange between this heat exchanging medium and the combustion air is performed in the fluidized bed type cooler 27 thereby to heat the combustion air for use in the premelting furnace 50 and the melting furnace 40a, and (3) the raw material for glass fed in through chute 86 and the exhaust gas are led to the cyclone 70 for the purpose of heating the raw materials for glass thereby subjecting them to heat exchange while in suspended state, and are separated from each other. In this way, the premelting of the raw materials for glass is facilitated, the thermal efficiency is enhanced drastically, and the regenerator of the melting furnace 40a can be dispensed with.

Next, in the following will be explained the course of flowing of the exhaust gas to heat the raw materials for glass as well as the combustion air. Referring to FIGS. 11 and 12, the exhaust gas generated in the premelting furnace 50 is drawn by the exhaust gas induction fan 11 from the exhaust duct 55 and enters the cyclone 16 for the purpose of heating the heat exchanging medium by way of the conduit 87. The exhaust gas generated by the burners 73a or 73b of the melting furnace 40a passes through the conduit 13a or 13b, conduit 82a or 82b and exchanging damper 15, and enters the cyclone 16 for the purpose of heating the heat exchanging medium together with the exhaust gas generated in the premelting furnace 50 via the conduit 87. Into the conduit 87 is fed a raw material for glass to serve as the heat exchanging medium, such as quartz sand, from the chute 85, and said raw material suspends in the exhaust gas generated in the premelting furnace 50 and the melting furnace 40a and flowing through the conduit 87, and enters the cyclone 16 for the purpose of heating the heat exchanging medium will undergoing heat exchange in a suspended state.

The exhaust gas after heating the heat exchanging medium goes in the cyclone 70 for the purpose of heating the raw materials for glass while preheating the raw materials for glass excluding cullet and carbon fed through the chute 86 when it passes through the conduit 88a, and is released to the atmosphere from the stack 80 by way of the exhaust gas induction fan 11 and the dust collector 74.

The heat exchanging medium is separated from the exhaust gas in the cyclone 16 and then is led to the fluidized bed type cooler 27 by way of the chute 88b. In this cooler 27, the heat exchanging medium is laid on the distributor 17a. At this, the blower 17b forces in air to serve as the combustion air so as to disperse it uniformly upward from beneath the distributor 17a. Consequently the heat exchanging medium is intensely commingled with air to become fluidized and, at the same time, is cooled, and thereafter it is discharged through the chute 17c. In this cooler 27, the air forced in from the blower 17b is heated by the heat exchanging medium.

A part of the heat exchanging medium fed to the fluidized bed type cooler 27 through the chute 88b is removed upon entering the cyclone 33 from the conduit 89a, and is reused for heating the combustion air. The combustion air heated by the heat exchanging medium in the fluidized bed type cooler 27 is drawn by the blower 34 to pass through the conduit 89a, cyclone 33 and conduit 89b in that order, and a part thereof is fed to the premelting furnace 50 by way of the conduit 90, while the remainder is fed to the melting furnace 40a from the exchanging damper 15 by way of the main conduit 82a or 82b. This combustion air contributes to combustion within the premelting furnace 50 as well as the melting furnace 40a and becomes exhaust gas thereafter, and enters the cyclone 16 for the purpose of heating the heat exchanging medium through the afore described pathway.

The groups of burners 73a and 73b of the melting furnace 40a are supposed to be periodically switched over to perform combustion and heat the melted glass uniformly. The switchover of the groups of burners 73a and 73b and the motion of the exchanging damper 15 are interlocked.

The raw materials for glass excluding carbon and cullet are compounded and then fed to the conduit 88a through the chute 86, whereby they are preheated sufficiently by the exhaust gas. Subsequently, the thus preheated raw materials for glass are led to the cyclone 70 for the purpose of preheating raw materials for glass thereby to be separated from the exhaust gas and collected, and thereafter enter the premelting furnace 50 by way of the chute 67 for the purpose of feeding raw materials for glass.

The heat exchanging medium (to wit, the aforesaid quartz sand in the case of this embodiment) is conveyed from the hopper 76a by means of the screw conveyor 75 and is fed to the conduit 87 through the chute 85 to be heated therein. Thereafter, the thus heated heat exchanging medium is collected by means of the cyclone 16 and enters the fluidized bed type cooler 27 through the chute 88b to heat combustion air therein. Subsequently, it is conveyed to the hopper 28 from the discharging chute 17c by means of the bucket elevator 26. The heat exchanging medium conveyed to the hopper 28 is weighed by the weigher 76. Other raw materials for glass, that is, soda ash, dolomite, lime stone, etc. are also weighed by the weighers 77, 78, 79, etc. respectively. The thus weighed raw materials for glass are conveyed by means of the conveyor 37 to the mixer 91 to be commingled thereby, are put in the conduit 88a from the chute 86 with the aid of the conveyor 36, and enter the cyclone 70 for the purpose of preheating the raw materials for glass.

In the foregoing embodiment, quartz sand which is one constituent of glass is applied as heat exchanging medium. This quartz sand fed to the hopper 76a plays the role of the heat exchanging medium while passing through the aforesaid channel, and next it is led to the hopper 28, is heated in the conduit 88a, and enters the premelting furnace 50 through the cyclone 70 for the purpose of preheating the raw materials for glass that is, the quartz sand is not circulated in the present apparatus. As another embodiment of the present invention, said quartz sand after discharging from the chute 17c of the fluidized bed type cooler 27 may be put in the hopper 76a again by means of the bucket elevator 26 so as to recycle it for reuse. On this occasion, in lieu of quartz sand, any other heat exchanging medium which has a satisfactory heat exchangeability, i.e., superior heat conductivity, is large in heat capacity, is easy to separate from gas, and scarcely wears down the lining of the cyclone, etc., may be employed. Employment of a raw material for glass such as quartz sand as heat exchanging medium is advantageous as the fuel for use in premelting the raw materials for glass can be minimized by virtue of putting the heat exchanging medium after using in heating the combustion air, which still retains a high temperature, into the premelting furnace 50.

In lieu of the fluidized bed type cooler 27, some other heat exchanger may as well employed.

Cullet and carbon as raw material for glass are fed through another chute 91 which is different from that for fellow raw materials such as quartz sand, soda ash, dolomite and lime stone, so as to enter the premelting furnace 50 through the chute 67. The reason for so doing is as follows. Inasmuch as cullet is usually employed in the form of coarse particles, if it is fed through the chute 86, it will wear down the lining of the cyclone 70 for the purpose of preheating the raw materials for glass and shorten the useful life thereof. As for carbon, inasmuch as it is to be applied in a small amount and is apt to scatter, if it is fed through the chute 86, there is a fear of its being discharged along with the exhaust gas. In this context, as cullet is in the form of coarse particles, it also will do to feed it from time to time along with other raw materials for glass through the chute 86 so as to remove the coating which is apt to deposit on the inner wall of the cyclone 70 for the purpose of preheating the raw materials for glass.

As still another embodiment of the present invention, the exhaust gas arising from either of the premelting furnace 50 and melting furnace 40a may be employed for heating the heat exchanging medium as well as the raw materials for glass. Also, it will do to employ the exhaust gas arising from the premelting furnace 50 for heating the heat exchanging medium (or the raw materials for glass) and employ the exhaust gas arising from the melting furnace 40a for heating the raw materials for glass (or the heat exchanging medium).

As illustrated in FIGS. 11 and 12, in the case where the conventional regenerators are not used in the melting furnace 40a, the problem of variation of temperature of the combustion air attendant on the heating of combustion air by means of the conventional regenerators is eradicated, and the combustion air can be always maintained at a fixed temperature thereby facilitating the operation, and economical burden is extremely lightened.

Moreover, if desired, a pair of conventional regenerators may be installed in relation to the melting furnace 40a. On this occasion, it also will do to devise such that air is sent with the aid of a blower and an exchanging damper into a generator disposed on the side where the heating burners 73a or 73b are in operation, thereby performing the heating, and the exhaust gas generated in said regenerator is sent to the conduits 82a and 82b.

As elucidated in the foregoing, the present invention is devised to heat the combustion air by heating the heat exchaning medium with the exhaust gas generated in the premelting furnace as well as the melting furnace and also preheat the raw materials for glass. Accordingly, there can be achieved far higher thermal efficiency, coupled with superior thermal efficiency of the premelting furnace, compared with the conventional glass tank furnace. Besides, inasmuch as the heat exchanging medium employed therein is powdery, the contact area of the high-temperature exhaust gas and combustion air is remarkably enlarged, and accordingly, the present invention achieves an excellent effect that not only is it possible to take in the heat energy possessed by the exhaust gas by for effectively, but also the combustion air can be heated much more efficiently.

What is claimed is:

1. A method for premelting raw materials for glass and then feeding same to a glass tank furnace, which comprises the steps of:

feeding an atomized fuel into the upper end of an upright combustion chamber, blowing combustion air into the upper end of said combustion chamber so that said air swirls along the inner wall of the combustion chamber and burns the fuel whereby to generate a heated swirling combustion gas atmosphere in said combustion chamber, and feeding said raw materials for glass into the upper end of said combustion chamber whereby said raw materials become melted therein by contact with said heated combustion gas atmosphere and move downwardly toward the lower end of said combustion chamber;

flowing a stream of molten raw materials and combustion gas from the lower end of said combustion chamber downwardly through a downwardly and sidewardly inclined duct;

then separating said combustion gas from said molten raw materials at the lower end of said inclined duct by flowing said combustion gas upwardly through an exhaust gas duct which extends upwardly from said lower end of said inclined duct and by flowing said molten raw materials downwardly through an upright duct which extends downwardly from the lower end to said inclined duct and communicates with the glass tank furnace.

2. A method according to claim 1 in which said raw materials for glass are fed into said combustion chamber by being suspended in said combustion air blown into said combustion chamber.

3. A method according to claim 1 in which said exhaust gas duct communicates with the upper side of said inclined duct at the lower end thereof and diverges upwardly with respect to said exhaust gas duct so that the exhaust gas flows through a substantially V-shaped path in said inclined duct and said exhaust gas duct, and said upright duct extends vertically downwardly from the lower side of said inclined duct at the lower end thereof, said inclined duct having a transverse end wall surface portion at its lower end and on the opposite side of said exhaust gas duct and said upright duct from said combustion chamber so that incompletely melted raw materials flowing through said inclined duct collide against said wall surface portion and adhere to the molten raw materials thereat.

4. A method for premelting raw materials for glass and then feeding same to a glass tank furnace, which comprises:

flowing through a duct a stream of high temperature exhaust gas from a glass tank furnace and/or the below-mentioned combustion chamber;

dispersing raw materials for glass in said stream and forming a suspension of said raw materials in said exhaust gas whereby said raw materials are preheated by said exhaust gas;

separating said preheated raw materials from said exhaust gas;

feeding an atomized fuel into the upper end of an upright combustion chamber, blowing combustion air into the upper end of said combustion chamber so that said air swirls along the inner wall of the combustion chamber and burns the fuel whereby to generate a heated swirling combustion gas atmosphere in said combustion chamber and feeding said preheated raw materials into the upper end of said combustion chamber whereby said preheated raw materials become melted therein by contact with said heated combustion gas atmosphere and moved downwardly toward the lower end of said combustion chamber;

flowing a stream of molten raw materials and combustion gas from the lower end of said combustion chamber downardly through a downwardly and sidewardly inclined duct;

then separating said combustion gas from said molten raw materials at the lower end of said inclined duct and flowing said molten raw materials into a glass tank furnace.

5. A method according to claim 4 in which the combustion gas discharged from said combustion chamber is combined with said exhaust gas from said glass tank furnace whereby said raw materials are preheated by a mixture of said combustion gas and said exhaust gas.

6. A method according to claim 4 in which said combustion air fed into said combustion chamber is preheated by flowing it through a regenerator of said glass tank furnace.

7. A method according to claim 4 in which the suspension of said preheated raw materials and said exhaust gas is flowed into cyclone means whereby to separate said preheated raw materials from said exhaust gas.

8. A method according to claim 4 in which carbon, cullet or mixture thereof are fed into the preheated raw materials entering said combustion chamber.

9. A method for premelting raw materials for glass and then feeding same to a glass tank furnace, which comprises:

discharging a stream of high temperature exhaust gas from a glass tank furnace;

suspending particles of a heat exchange substance in said exhaust gas whereby said particles are heated by said exhaust gas;

feeding the suspension into solid-gas separation means and therein separating said heated particles from said exhaust gas;

then passing said heated particles in heat exchange contact with air whereby to preheat said air;

feeding an atomized fuel into the upper end of an upright combustion chamber, blowing combustion air into the upper end of said combustion chamber so that said air swirls along the inner wall of the combustion chamber and burns the fuel whereby to generate a heated swirling combustion gas atmosphere in said combustion chamber and feeding said raw materials for glass into the upper end of said combustion chamber whereby said raw materials become melted therein by contact with said heated combustion gas atmosphere and move downwardly toward the lower end of said combustion chamber;

flowing a stream of molten raw materials and combustion gas from the lower end of said combustion chamber downwardly through a downwardly and sidewardly inclined duct;

then separating said combustion gas from said molten raw materials at the lower end of said inclined duct and flowing said molten raw materials into a glass tank furnace; and utilizing said preheated air as combustion air fed into said combustion chamber and/or as combustion air for said glass tank furnace.

10. A method according to claim 9 wherein said suspension is flowed into cyclone means to separate said heated particles from said exhaust gas.

11. A method according to claim 10 wherein said heated particles discharged from said cyclone means are contacted by said stream of air to form a fluidized bed from which the preheated air escapes upwardly, flowing said preheated air through second cyclone means to separate particles entrained therein, feeding a portion of the preheated air from said second cyclone means to said glass tank furnace and feeding the remainder of said preheated air to said combustion chamber, and recycling said particles for further heating by said exhaust gas.

12. A method according to claim 9, including the steps of continuously dispersing powdery raw materials for making glass in said exhaust gas after said exhaust gas has been separated from said heated particles, said powdery raw materials being suspended in said exhaust gas whereby said powdery raw materials remain in contact with said exhaust gas and are heated by direct contact with said exhaust gas while in a suspended state herein, separating said heated powdery raw materials from said exhaust gas; and then feeding said heated powdery raw materials into said combustion chamber.

13. A method according to claim 12, including the step of feeding carbon and/or cullet to said combustion chamber along with said heated powdery raw materials.

14. A method according to claim 9 wherein said particles comprise at least one component which is a raw material for making glass and wherein, after said heated particles are separated from said exhaust gas, said heated particles are fed into said combustion chamber.

15. A method according to claim 14 wherein said suspension is flowed into cyclone means to separate said heated particles from said exhaust gas.

16. A method according to claim 14 wherein said component is quartz sand.

17. A method according to claim 14, including the step of feeding carbon and/or cullet to said combustion chamber along with said heated powdery raw materials.

18. A method according to claim 9 wherein, after said heated particles have been separated from said exhaust gas, said heated particles are passed in heat exchange contact with a stream of air whereby said air become preheated, separating said preheated air from said particles and feeding said preheated air to said glass tank furnace and/or said combustion chamber for use in burning a fuel therein, suspending said particles which have been separated from said preheated air and other powdery raw materials for making glass in the exhaust gas which was previously used for heating said particles whereby to reheat said particles and to heat said other powdery raw materials, separating said particles and said other powdery raw materials from said exhaust gas and then feeding them into said combustion chamber.

19. A method according to claim 18, including the step of feeding carbon and/or cullet to said combustion chamber along with said heated powdery raw materials.

20. An apparatus for premelting the raw materials for glass, which comprises a combustion chamber having a circular horizontal section, air inlet duct means at the upper part of said combustion chamber for feeding air thereinto in a tangential direction, fuel feed means at the uper part of the combustion chamber for feeding fuel into said combustion chamber for combustion therein, means connected to said air inlet duct for feeding raw materials for glass so that said raw materials enter said combustion chamber with the air, a downwardly and sidewardly inclined duct extending from the lower end of said combustion chamber, an upright duct extending downwardly from the lower end of said inclined duct for feeding the premelted raw materials to a glass tank furnace, and an exhaust gas duct extending upwardly from the lower end of said inclined duct for discharging the combustion exhaust gas, said exhaust gas duct being connected to the boundary portion between said inclined duct and said upright duct.

21. An apparatus for premelting the raw materials for glass according to claim 20, wherein said fuel feed means comprises atomizing nozzles disposed in face-to-face relation and at positions close to the tangential direction of the air inlet duct means.

22. An apparatus for premelting the raw materials for glass according to claim 20, wherein the lower end portion of said downwardly inclined duct is narrowed for throttling flow of exhaust gas, and the cross-sectional area of the exhaust gas duct is enlarged adjacent to the lower end of said inclined duct.

23. An apparatus according to claim 20, wherein said inclined duct, said exhaust gas duct and said upright duct define a substantially Y-shaped, wherein said inclined duct and said exhaust gas duct define the branched legs of the Y and the upright duct defines the stem of the Y.

* * * * *